US010787148B2

(12) United States Patent
Roby et al.

(10) Patent No.: US 10,787,148 B2
(45) Date of Patent: *Sep. 29, 2020

(54) PRISONER TRANSPORT SYSTEM AND METHOD (71) Applicant: Sirchie Acquisition Company, LLC., Youngsville, NC (US)

(72) Inventors: John G Roby, Youngsville, NC (US); Neil Smith, Jr., Medford, NJ (US); Dan Nichols, Medford, NJ (US)

(73) Assignee: SIRCHIE ACQUISITION COMPANY, LLC, Youngsville, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/395,704

(22) Filed: Apr. 26, 2019

(65) Prior Publication Data
US 2019/0248324 A1 Aug. 15, 2019

Related U.S. Application Data (63) Continuation of application No. 15/460,863, filed on Mar. 16, 2017, now Pat. No. 10,315,614.

(60) Provisional application No. 62/311,579, filed on Mar. 22, 2016.

(51) Int. Cl.
*B60R 22/00* (2006.01)
*B60R 11/00* (2006.01)
*B60N 2/24* (2006.01)

(52) U.S. Cl.
CPC ............... *B60R 22/00* (2013.01); *B60N 2/24* (2013.01); *B60R 11/00* (2013.01); *B60R 2022/003* (2013.01)

(58) Field of Classification Search
CPC ... B60R 22/00; B60R 11/00; B60R 2022/003; B60N 2/24
See application file for complete search history.

(56) References Cited

U.S. PATENT DOCUMENTS

| | | | |
|---|---|---|---|
| 2,695,052 A | 11/1954 | Yates et al. | |
| 2,726,714 A | 12/1955 | McAndrews | |
| 2,833,343 A | 5/1958 | Benson | |
| 3,385,633 A | 5/1968 | Aizley | |
| 3,618,975 A | 11/1971 | Bombach | |
| 3,964,798 A | 6/1976 | Burleigh | |
| 4,784,889 A * | 11/1988 | Daniels ............... | A41D 27/245 128/876 |
| 4,947,801 A | 8/1990 | Glass | |
| 5,544,363 A | 8/1996 | McCue et al. | |

(Continued)

FOREIGN PATENT DOCUMENTS

| | | |
|---|---|---|
| CA | 1054113 A | 5/1979 |
| EP | 2598373 A1 | 6/2013 |
| FR | 2914595 A3 | 10/2008 |

OTHER PUBLICATIONS

Extended European search report dated Jun. 30, 2017 issued in related European Patent Application No. 17162015.6.

*Primary Examiner* — Philip F Gabler
(74) *Attorney, Agent, or Firm* — McGuire Woods LLP (57) ABSTRACT A transport system and method for securely transporting subjects such as prisoners or persons that include a belt and a slideably engagable channel positioned across a part of a vehicle seat or bench for securing the belt and subject within the vehicle.

17 Claims, 9 Drawing Sheets (56) References Cited

U.S. PATENT DOCUMENTS

| | | | | |
|---|---|---|---|---|
| 5,746,157 | A * | 5/1998 | Warwaruk | A01K 1/0272 |
| | | | | 119/785 |
| 6,571,912 | B2 | 6/2003 | Söll | |
| 6,676,219 | B1 | 1/2004 | Brewer | |
| 6,857,430 | B2 | 2/2005 | Morris | |
| 6,896,291 | B1 | 5/2005 | Peterson | |
| 7,063,389 | B2 * | 6/2006 | Kennedy, Sr. | B60N 2/688 |
| | | | | 297/475 |
| 7,954,901 | B2 | 6/2011 | Foye et al. | |
| 8,061,781 | B2 | 11/2011 | Foye et al. | |
| 10,315,614 | B2 * | 6/2019 | Roby | B60N 2/24 |
| 2005/0110259 | A1 | 5/2005 | Church et al. | |
| 2007/0158969 | A1 | 7/2007 | Walkingshaw | |
| 2009/0032661 | A1 | 2/2009 | Letourneau | |
| 2015/0145311 | A1 | 5/2015 | Squires | |
| 2015/0315823 | A1 | 11/2015 | Stevens | |
| 2016/0039387 | A1 | 2/2016 | Taubert et al. | |

* cited by examiner

PRISONER TRANSPORT SYSTEM AND METHOD

CROSS-REFERENCE TO RELATED APPLICATIONS

This application is a continuation of U.S. patent application Ser. No. 15/460,863 filed Mar. 16, 2017, which claims benefit and priority to U.S. Provisional Application No. 62/311,579, filed Mar. 22, 2016, the disclosures of which are incorporated by reference herein in their entirety.

BACKGROUND

1.0 Field of the Disclosure

The present disclosure relates to a system and a method for securely transporting subjects and, more particularly, to a system and method for securely transporting prisoners, among other features.

2.0 Related Art

Current techniques for transporting subjects such as, e.g., prisoners and persons under arrest, are not particularly secure, and may not be safe for the personnel charged with overseeing such transportation. Moreover, current techniques of securing subjects such as, e.g., prisoners and persons under arrest, are cumbersome and not easy to use.

SUMMARY OF THE DISCLOSURE

The present disclosure provides an improved system and method for securing and transporting subjects, including potentially dangerous subjects, by vehicle.

In one aspect, a secure transport system comprises a retention assembly which comprises a channel section configured along a width of a vehicle, and a clamping section; one or more restraining belts configured to slidably engage the channel section and configured to be secured in a location along the channel section by the clamping section. Each of the one or more restraining belts may comprise a component to slidably engage the channel section. The clamping section may be operably movable to an open position to permit the component to slide within the channel section and the clamping section may be operably movable to a closed position to secure the component at a position along the channel section. Each of the one or more restraining belts comprise a locking mechanism to lock a restraining belt about a subject. The secure transport system may further comprise a control mechanism to control the clamping section to be in a closed or open position. The control mechanism may be configured to be operated from outside a vehicle in which the clamping section is installed. The retention assembly may be configured as part of a bench within a vehicle. The retention assembly may further comprise an end portion comprising a plurality of second channel sections forming an angle to one another. The end portion may have a terminus proximate a loading area of a vehicle.

In one aspect, a secure transport system may comprise a retention assembly as part of a bench structure of a vehicle comprising: a channel section configured along a width of the vehicle; and a clamping section configured to engage a part of a restraining belt; the restraining belt having a component to slidably engage the channel section and configured to be secured in a location along the channel section by the clamping section. The clamping section may include a plurality of teeth sections and a plurality of slots engageable with the part of a restraining belt. The clamping section may be operably movable to open to permitting the part to slide within the channel section and the clamping section operably movable to close to secure the part at a position along the channel section. The restraining belt may comprise a locking mechanism to lock a restraining belt about a subject. The secure transport system may further comprise a control mechanism to control the clamping section to be in a closed or an open position. The control mechanism is configured to be operated from outside a vehicle in which the clamping section is installed. The restraining belt may be configured to surround a subject, and the component be secured to the channel section by the clamping section. The secure transport system may further comprise an end portion comprising a plurality of second channel sections forming an angle to one another and proximate or connecting to the channel section, wherein the end portion has a terminus proximate a loading area of a vehicle. The channel section may comprise a C-channel section.

In one aspect, a method for securely transporting subjects comprises providing a retention assembly comprising: a channel section configured along a width of a vehicle; and a clamping section; providing one or more restraining belts configured to slidably engage the channel section and configured to be secured in a location along the channel section by the clamping section. Each of the one or more restraining belts may comprise a component to slidably engage the channel section. Each of the one or more restraining belt comprises a locking mechanism to lock a respective restraining belt about a subject.

BRIEF DESCRIPTION OF THE DRAWINGS

The accompanying drawings, which are included to provide a further understanding of the disclosure, are incorporated in and constitute a part of this specification, illustrate embodiments of the disclosure and, together with the detailed description, serve to explain the principles of the disclosure. No attempt is made to show structural details of the disclosure in more detail than may be necessary for a fundamental understanding of the disclosure and the various ways in which it may be practiced. In the drawings:

FIG. 4A is a perspective view; FIG. 4B is a side view.

The present disclosure is further described in the detailed description that follows.

DETAILED DESCRIPTION OF THE DISCLOSURE

The disclosure and the various features and advantageous details thereof are explained more fully with reference to the non-limiting examples that are described and/or illustrated in the accompanying drawings and detailed in the following description and attachment. It should be noted that the features illustrated in the drawings are not necessarily drawn to scale, and features of one example may be employed with other examples as the skilled artisan would recognize, even if not explicitly stated herein. Descriptions of well-known components and processing techniques may be omitted so as to not unnecessarily obscure the examples of the disclosure. The examples used herein are intended merely to facilitate an understanding of ways in which the invention may be practiced and to further enable those of skill in the art to practice the examples of the disclosure. Accordingly, the examples herein should not be construed as limiting the scope of the invention.

The terms "including", "comprising" and variations thereof, as used in this disclosure, mean "including, but not limited to", unless expressly specified otherwise.

The terms "a", "an", and "the", as used in this disclosure, means "one or more", unless expressly specified otherwise. The term "about" means within plus or minus 10%, unless context indicates otherwise.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential order, such processes, methods and algorithms may be configured to work in alternate orders. In other words, any sequence or order of steps that may be described does not necessarily indicate a requirement that the steps be performed in that order. The steps of the processes, methods or algorithms described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

Figure 1A:
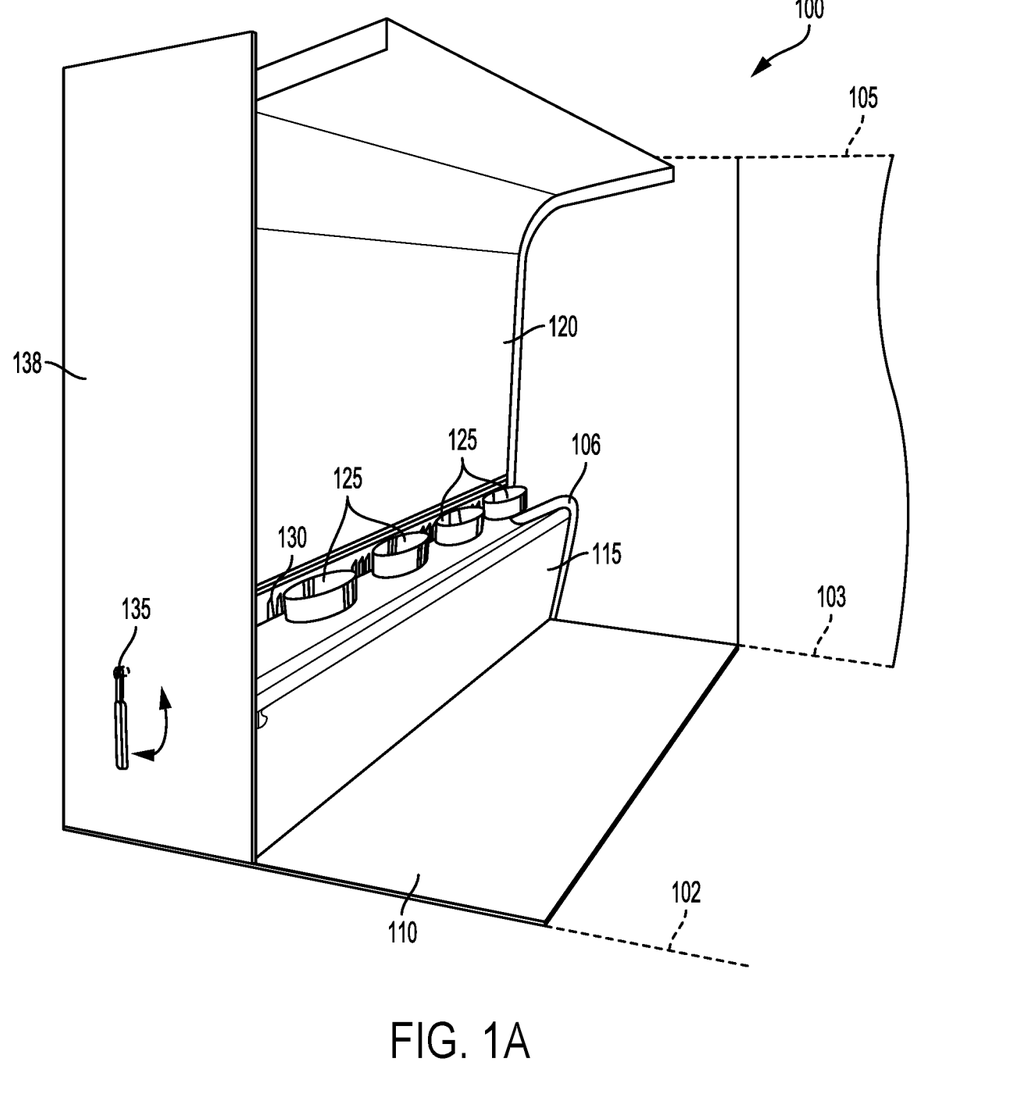
FIGS. 1A and 1B are perspective views of an example of a secure transport system, configured according to principles of the disclosure.
Figure 1B:
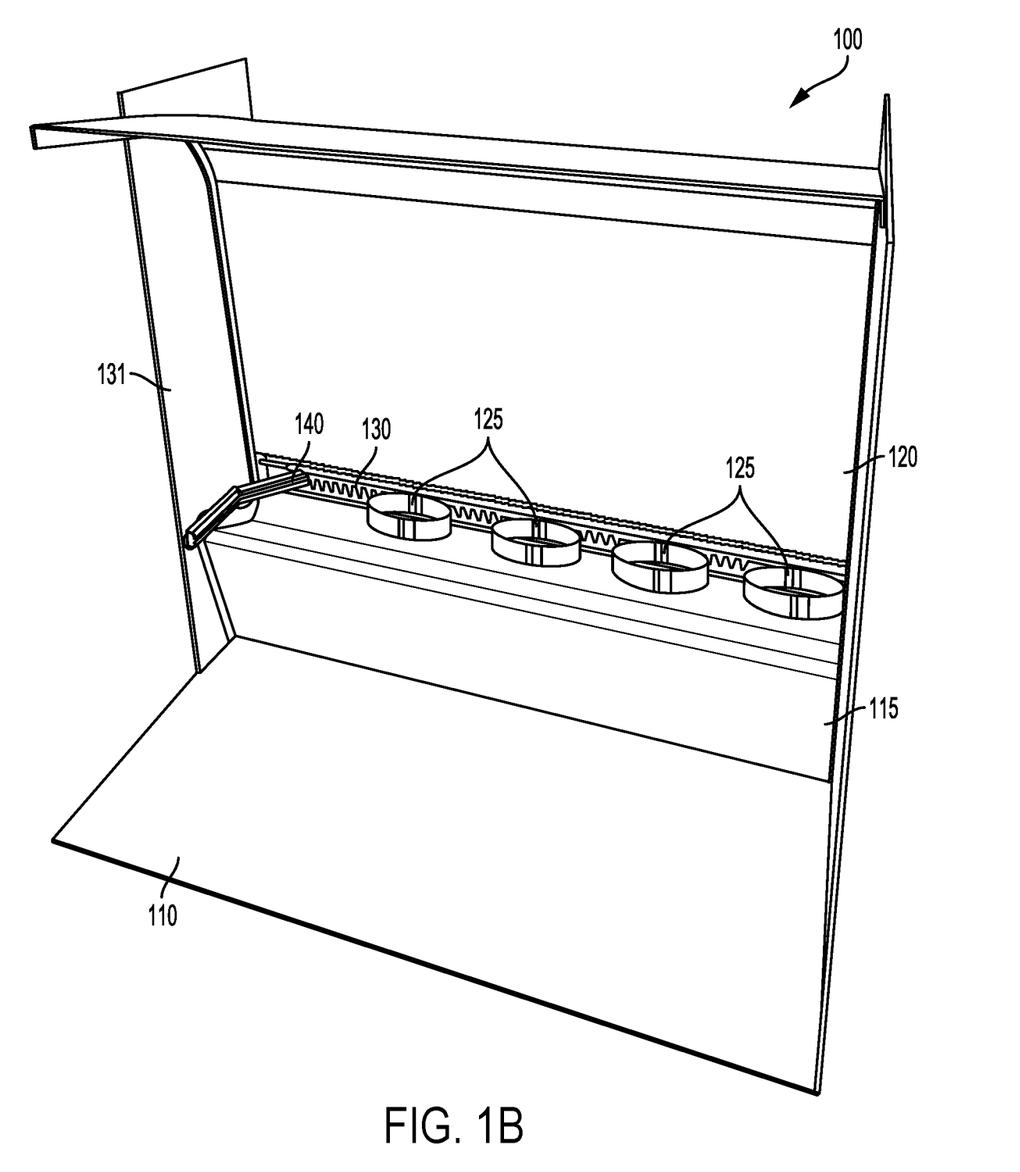

FIGS. 1A and 1B are perspective views of a secure transport system 100, configured according to principles of the disclosure. The secure transport system 100 may be installed in a vehicle 105 having an inner wall 131 and an outer wall 138, which may be a truck, van, or prisoner van, paddy wagon, police carrier, or the like. The secure transport system 100 may comprise a retention assembly 130 that is configured to open and close an operatively movable clamping section 134 by action of a control mechanism 135, described more fully below. The retention assembly 130 may be secured to or configured to be a part of the bench structure 115, such as secured to vertical back wall 120 of the bench structure 115. In some embodiments, the back wall 120 may be a separate component from the bench 115.

Figure 2A:
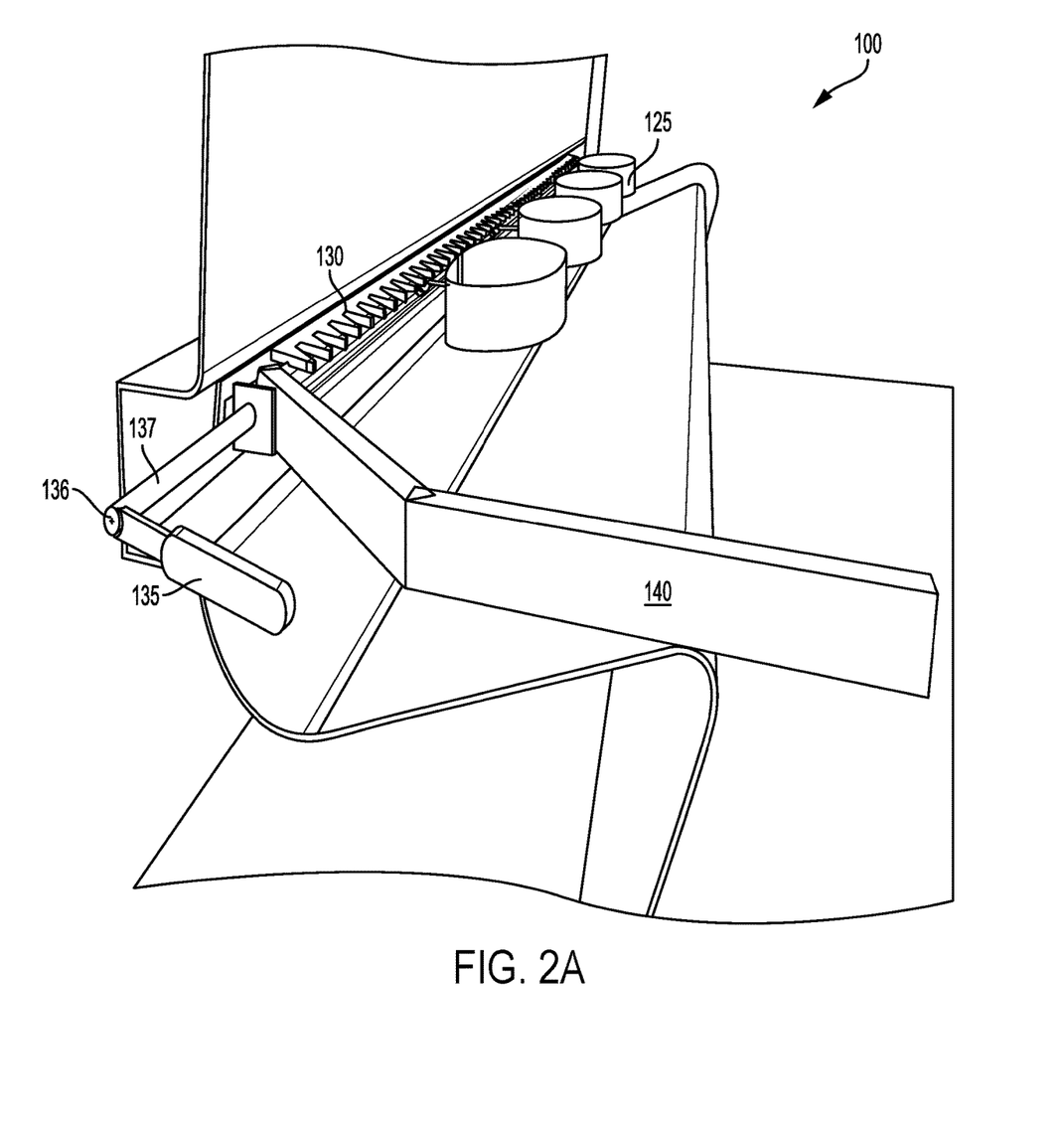
FIG. 2A is a perspective view of an example of a retention assembly of the secure transport system of FIG. 1 in an open position with restraining belts, configured according to principles of the disclosure.
Figure 2B:
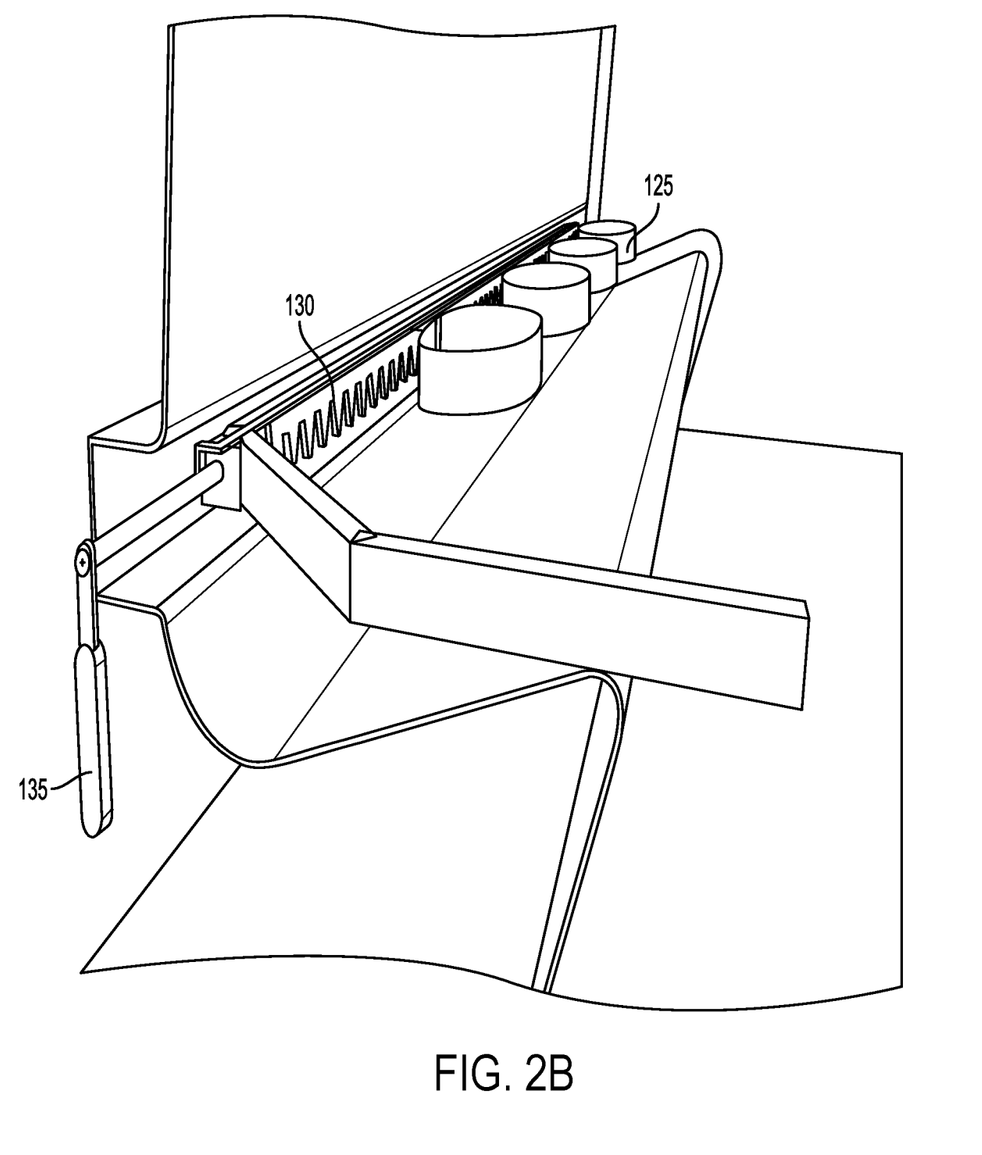
FIG. 2B is a perspective view of an example of a retention assembly of the secure transport system of FIG. 1, in a closed position with restraining belts, configured according to principles of the disclosure.
Figure 2C:
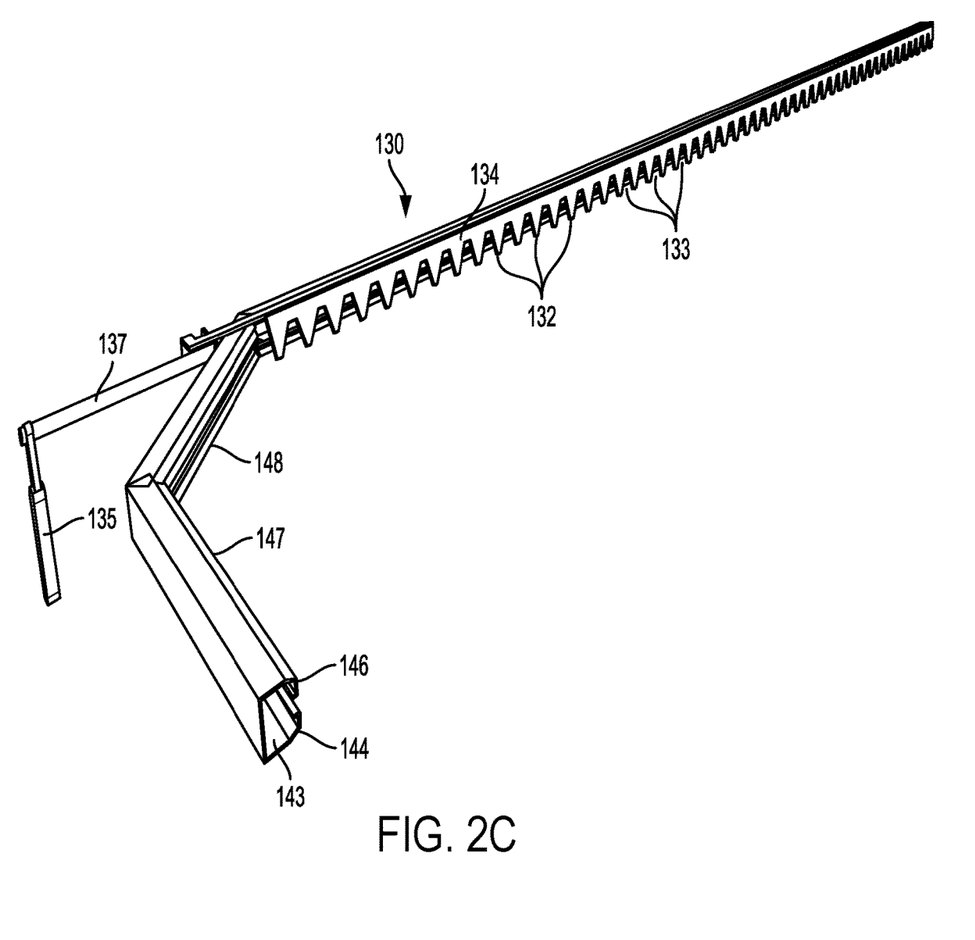
FIG. 2C is an example of a retention assembly in a closed position, including an end portion, configured according to principles of the disclosure.
Figure 3:
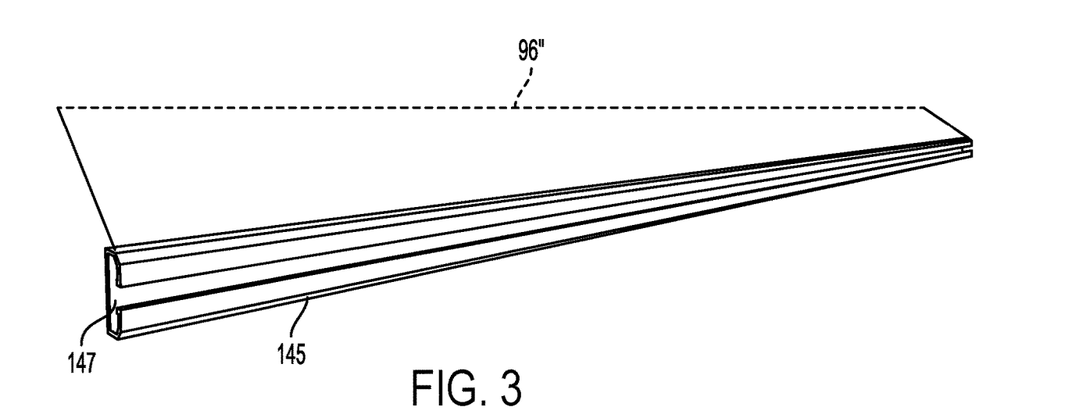
FIG. 3 is an example of a channel section, configured according to principles of the disclosure.
Figure 4A:
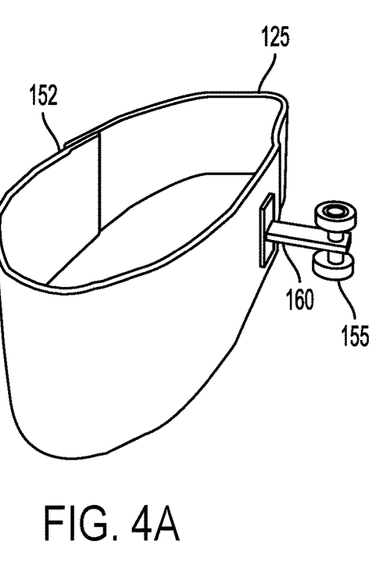
Figure 4B:
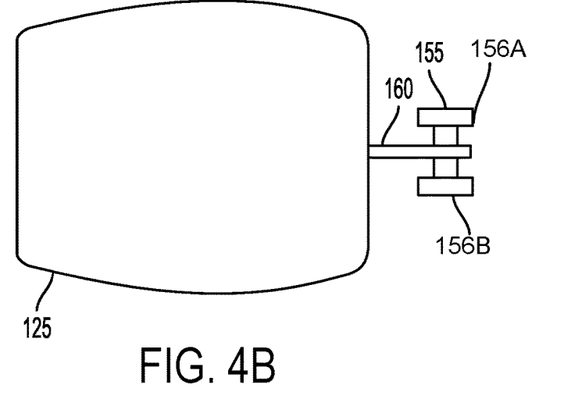
Figure 4C:
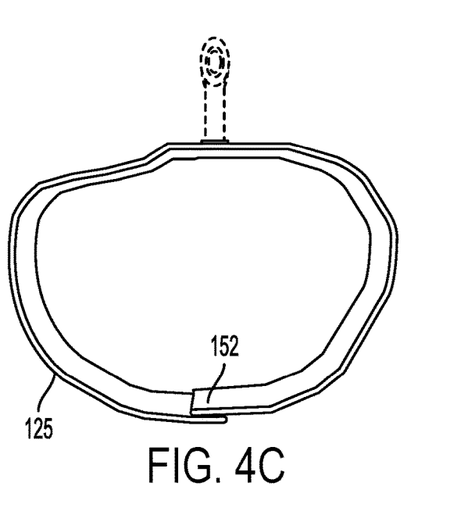
FIG. 4C is a top view of a restraining belt, configured according to principles of the disclosure.

The retention assembly 130 may comprise a channel section such as a C-channel section 145 (FIG. 3) arranged along a length of the bench structure 115, typically (but not necessarily) along a width from a first side 102 of the vehicle 105 to a second side 103 of the vehicle 105, and an operatively movable clamping section 134 (FIG. 2C). The width may be less than the interior width of the vehicle 105, such as half the width. The bench structure 115 is configured to support a subject such as when sitting. The C-channel section 145 may be positioned at a height above the seat 106 proximate the waist of a subject that may be sitting on the seat 106. The retention assembly 130 may include an end portion 140 comprising a plurality of second C-channel sections 147, 148 (FIG. 2C) that may be connected to or positioned proximate the C-channel 145 and configured to slideably accept one or more restraining belts 125 in an interior portion 143 of the end portion 140 and of the C-channel section 145. The end portion 140 may be configured with a terminus 144, typically positioned near an entrance or loading/unloading area 110 of the vehicle 105. The end portion 140 may permit acceptance and sliding of a component, such as retaining lug 155, of the one or more restraining belts 125 along the retention assembly 130, including along end portion 140 and the C-channel section 145. The one or more restraining belts 125 may already be placed on one or more subjects prior to insertion into the end portion 140. The plurality of second C-channel sections 147, 148 may be arranged at an angle to one another to conform to an inner wall 131 of the vehicle 105 and also to permit the one or more restraining belts 125 to freely slide from the end portion 140 into the C-channel section 145. The plurality of second C-channel sections 147, 148 may be permanently attached to one another such as by welding, or may be removably attached to one another such as, e.g., by bolting, which may be a secured type of bolt that cannot be easily removed. The end portion 140 and the C-channel section 145 may be attached to one another in a similar manner.

In some embodiments, one or more curved portions (not shown) may be used instead of the angled plurality of C-channels sections 147, 148. The plurality of second C-channel sections 147, 148 and the C-channel section 145 may include upper and lower curved or multi-angled portions 146 that may include inwardly angled elements to maintain the one or more restraining belts 125 within an interior portion 143 while also permitting sliding of the one or more restraining belts 125 within the interior portion 143.

In some applications, the retention assembly 130 may be fastened to the bench structure 115 such as a common frame, or the retention assembly 130 may be molded as an integral part of the bench structure 115. Alternatively, or in addition, retention assembly 130 may be secured directly to a portion, such as a frame, of the vehicle 105.

Figure 2D:
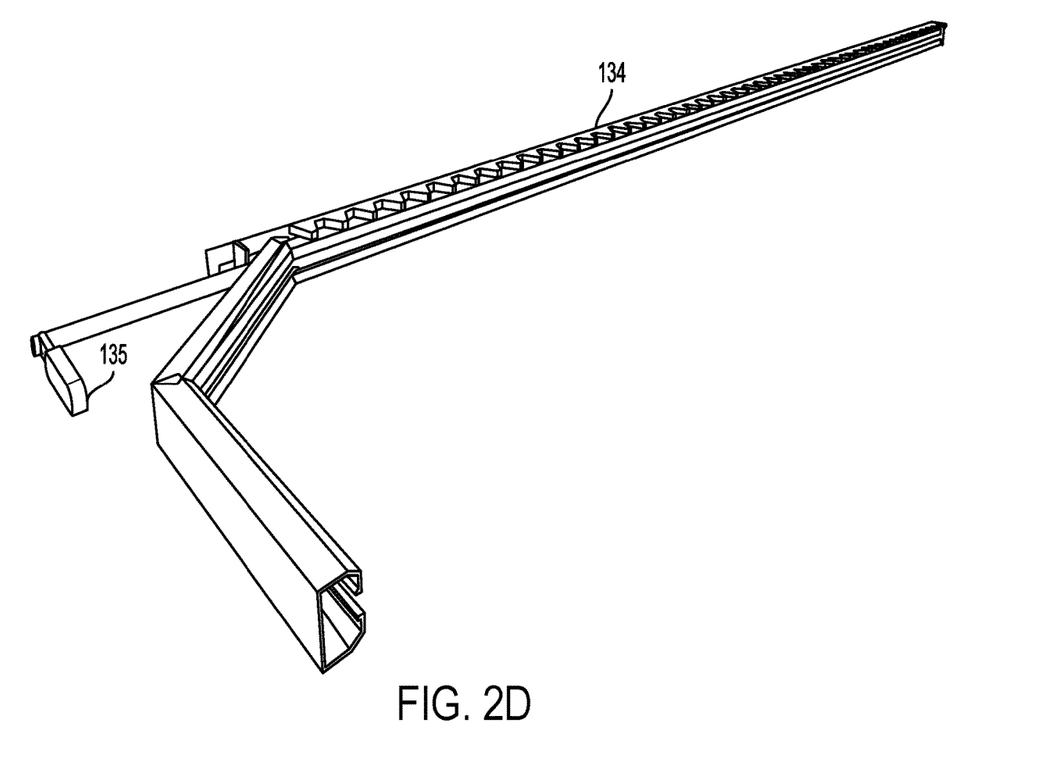
FIG. 2D is an example of a retention assembly in an open position, including an end portion, configured according to principles of the disclosure.

The operatively movable clamping section 134 may be closed as shown in FIGS. 1B, 2B and 2C by operation of the control mechanism 135 which may include a rod 137 that may be attached to the clamping section 134. The operatively movable clamping section 134 may be opened as shown in FIGS. 2A and 2D. Opening and closing of clamping section 134 may be achieved by rotation of the control mechanism 135 and rod 137. When in the opened state, the retaining lug 135 of the one or more restraining belts 125 may be moved or slid along the retention assembly 130, including end portion 140 and the C-channel section 145. When a desired location along the C-channel section 145 is reached, the control mechanism 135, which may be, e.g., a handle or lever, may be closed as shown in FIGS. 2B and 2C thereby locking the retaining lug 135 of the one or more restraining belts 125 in place so that it can no longer move along the C-channel section 145, thereby securing a subject(s) wearing the one or more restraining belts 125 at a fixed location within vehicle 105. In this way, multiple subjects, e.g., a prisoner(s) or a person(s) who may be under arrest or otherwise being transported, may be secured at selected spaced-apart locations as deemed appropriate by the user, such as, e.g., a security officer, along the length of the C-channel section 145. When the clamping section 134 is in the open state, the subject may move along the C-channel section 145 in a controlled and constrained fashion until a retaining lug 155 reaches the terminus 144. The subject may then exit the vehicle 105 at the loading/unloading area 110.

The operatively movable clamping section 134 may comprise a plurality of teeth sections 132 and a plurality of slots 133 configured to engage one or more retaining lugs 155 to hold a subject or subjects securely in place when the operatively movable clamping section 134 is in the closed position. The teeth sections may have a V-shape, but may be other shapes. The one or more restraining belts 125 may comprise a stand-off portion 160 to provide space between belt 125 and the retaining lug 155 which allows a small space between a subject wearing a restraining belt 125 and the vertical back wall 120 while also permitting free sliding of the one or more retaining lugs 155 along the C-channel section 145 as needed, and also to permit closing of the operatively movable clamping section 134 enveloping the one or more retaining lugs 155. Sliding of the one or more retaining lugs 155 along the C-channel section 145 permits selective spacing of subjects along the bench structure 115. For example, two subjects may be spaced and secured at opposite ends of the bench structure 115 so that they may not physically interact with each other during transport. The retaining lug 155 may include two lobes 156A, 156B at opposite ends to engage with an upper C-channel portion and a lower C-channel portion.

The one or more restraining belts 125 may be secured to a subject by a locking mechanism 152. The locking mechanism 152 may be any technique to secure the belt around a subject and may be locked by a key, a code or similar technique.

The secure transport system 100 may be used to securely transport subjects, such as, e.g., prisoners, a person or persons under arrest, distressed or ill persons, or the like. In some applications, the secure transport system 100 may also be used to secure one or more animals, perhaps with a reconfigured restraining belt to conform to the shape of the animal.

In one motion of the control mechanism 135, one or more subjects may be secured in fixed locations (selected from among a plurality of possible different locations) within vehicle 105. In one aspect, the control mechanism 135 may be located outside of the vehicle 105, away from the subjects being detained or transported. In some embodiments, the control mechanism 135 may be independently locked such as by a key or other locking mechanism 136 to prevent unauthorized operation of the secure transport system 100.

Figure 5:
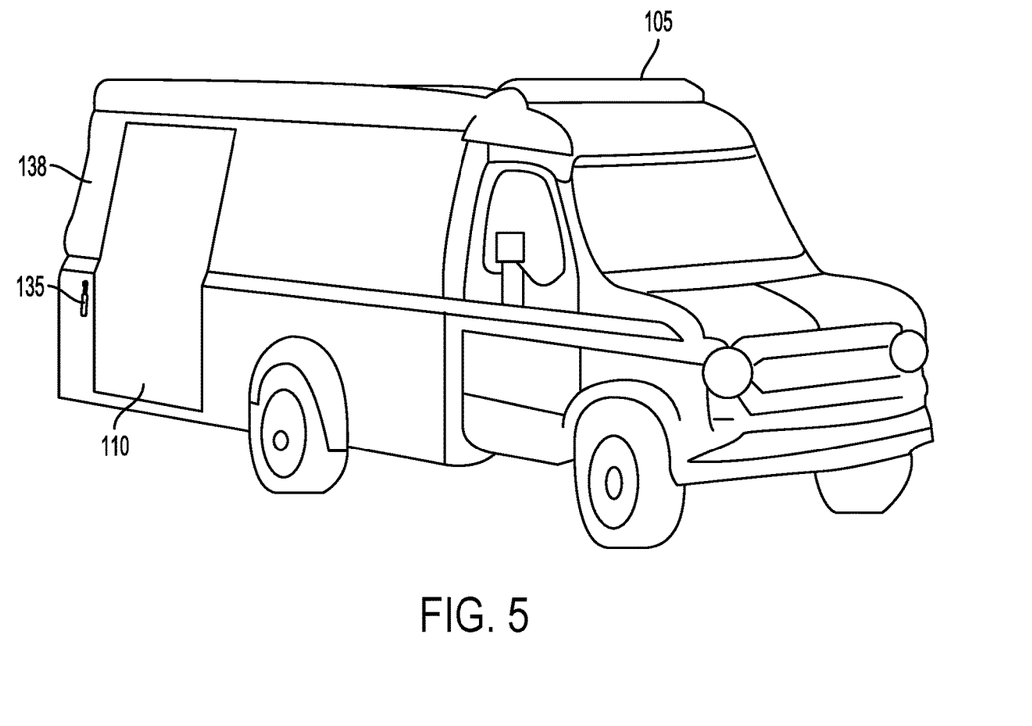
FIG. 5 illustrates an example vehicle that may be equipped with a secure transport system, configured according to principles of the disclosure.

FIG. 5 illustrates an example vehicle 105 that may be equipped with a secure transport system described herein, configured according to principles of the disclosure. The vehicle 105 may be any vehicle that may be equipped with a secure transport system, e.g., system 100. The vehicle 105 may comprise, e.g., a truck, a van, a paddy wagon, a police carrier, a bus, a train car, an auto or a similar vehicle. The vehicle 105 is shown with the loading area 110 on the first side 102 of the vehicle, but could be arranged to be at any side including the rear of the vehicle 105 or the second side 103 of the vehicle 105. The control mechanism 135 may be re-positioned accordingly depending on where the loading area 110 is located. In some applications, there may be at least two loading areas, such as opposite from one another, each loading area 110 may be equipped with a control mechanism 135 which may operate a common clamping section 134, or a non-common clamping section 134. In some applications, the secure transport system could be employed in a stationary type setting such as a holding area in a building.

While the invention has been described in terms of examples, those skilled in the art will recognize that the invention can be practiced with modifications in the spirit and scope of the appended claims. These examples are merely illustrative and are not meant to be an exhaustive list of all possible designs, embodiments, applications or modifications of the invention.

What is claimed:

1. A secure transport system, comprising:
a retention assembly comprising:
a channel section configured along a width of a vehicle;
a clamping section;
one or more restraining belts configured to slidably engage the channel section and configured to be secured in a location along the channel section by the clamping section; and
a first locking mechanism located outside of the vehicle and operatively connected to the clamping section to lock the one or more restraining belts at a positon along the channel section.

2. The secure transport system of claim 1, wherein each of the one or more restraining belts comprise a component to slidably engage the channel section.

3. The secure transport system of claim 2, wherein the clamping section is operably movable to an open position to permit the component to slide within the channel section and the clamping section operably movable to a close position to secure the component at a position along the channel section.

4. The secure transport system of claim 1, wherein each of the one or more restraining belts comprise a second locking mechanism to lock a restraining belt about a subject.

5. The secure transport system of claim 1, further comprising a control mechanism to control the clamping section to be in a closed or open position.

6. The secure transport system of claim 5, wherein the control mechanism is configured to be operated from outside the vehicle in which the clamping section is installed.

7. The secure transport system of claim 1, wherein the retention assembly is configured as part of a bench within the vehicle.

8. The secure transport system of claim 1, wherein the retention assembly further comprises an end portion comprising a plurality of second channel sections forming an angle to one another.

9. The secure transport system of claim 8, wherein the end portion has a terminus proximate a loading area of a vehicle.

10. A secure transport system, comprising:
a retention assembly configured as part of a bench structure of a vehicle comprising:
a channel section configured along a width of the vehicle; and
a clamping section to engage a part of a restraining belt, the restraining belt having a component configured to slidably engage the channel section and configured to be secured in a location along the channel section by the clamping section; and a first locking mechanism located outside the vehicle that locks the clamping section in relation to the channel section.

11. A secure transport system of claim 10, wherein the clamping section includes a plurality of teeth sections and a plurality of slots engageable with the part of a restraining belt.

12. The secure transport system of claim 10, wherein the clamping section is configured to be operably movable to open to permitting the part to slide within the channel section and the clamping section operably movable to close to secure the part at a position along the channel section.

13. The secure transport system of claim 10, wherein the restraining belt comprises a second locking mechanism to lock a restraining belt about a subject.

14. The secure transport system of claim 10, further comprising a control mechanism to control the clamping section to be in a closed or an open position.

15. The secure transport system of claim 14, wherein the control mechanism is configured to be operated from outside a vehicle in which the clamping section is installed.

16. The secure transport system of claim 10, wherein the restraining belt is configured to surround a subject, and the component be secured to the channel section by the clamping section.

17. The secure transport system of claim 10, further comprising an end portion comprising a plurality of second channel sections forming an angle to one another and proximate or connecting to the channel section, wherein the end portion has a terminus proximate a loading area of a vehicle.

* * * * *